(12) United States Patent
Yang et al.

(10) Patent No.: US 7,891,087 B2
(45) Date of Patent: Feb. 22, 2011

(54) METHOD OF CONNECTING A BUS BAR TO A CAPACITOR

(75) Inventors: Chang Hoon Yang, Cheonan (KR); Dae Jin Park, Cheonan (KR); Yong Won Jun, Yesan-Gun (KR); Chang Geun Park, Yesan-Gun (KR); Yun Rak Kim, Seoul (KR)

(73) Assignee: Nuintek Co., Ltd., Asan (KR)

( * ) Notice: Subject to any disclaimer, the term of this patent is extended or adjusted under 35 U.S.C. 154(b) by 20 days.

(21) Appl. No.: 12/479,479

(22) Filed: Jun. 5, 2009

(65) Prior Publication Data

US 2010/0000089 A1  Jan. 7, 2010

(30) Foreign Application Priority Data

Jul. 7, 2008  (KR) ...................... 10-2008-0065419

(51) Int. Cl.
  *H01R 43/00* (2006.01)
(52) U.S. Cl. ...................... 29/827; 29/25.41; 29/25.42; 29/854; 29/857; 29/884
(58) Field of Classification Search ................ 29/25.41, 29/25.42, 827, 854, 857, 884
  See application file for complete search history.

(56) References Cited

U.S. PATENT DOCUMENTS 4,158,745 A * 6/1979 Keller ...................... 174/536
4,616,416 A * 10/1986 Cabaud ........................ 29/884
4,935,803 A * 6/1990 Kalfus et al. ................. 257/673
5,867,895 A * 2/1999 Van Beneden et al. ......... 29/827
6,258,621 B1 * 7/2001 Ohuchi et al. ............... 438/106
6,270,835 B1 * 8/2001 Hunt et al. .................... 427/79
6,897,567 B2 * 5/2005 Horie .......................... 257/673
7,675,144 B2 * 3/2010 Horie .......................... 257/673

* cited by examiner

*Primary Examiner*—C. J. Arbes
(74) *Attorney, Agent, or Firm*—Schmeiser, Olsen & Watts, LLP

(57) ABSTRACT

Disclosed are a method for connecting a bus bar of a capacitor, improving temperature characteristics and reliability of the capacitor by reducing inductance and impedance such that heat generation is restrained during use of the capacitor, and a product fabricated by the same.

A pair of bus bars are insulatedly connected to sprayed surfaces on both sides of a plurality of capacitor devices, in such a manner that lead frames arranged alternately on a first bus bar are connected in contact with the sprayed surfaces facing in a diagonal direction, of neighboring capacitor devices. Other lead frames arranged alternately on a second bus bar are connected to the sprayed surfaces facing in another diagonal direction across the above diagonal direction in an X-shape. Then, the pair of bus bars are assembled to be insulated from each other and overlapped at one side of the capacitor device.

9 Claims, 5 Drawing Sheets

METHOD OF CONNECTING A BUS BAR TO A CAPACITOR

BACKGROUND OF THE INVENTION

1. Field of the Invention

The present invention relates to a method for connecting a bus bar of a capacitor, capable of improving temperature characteristics and reliability of the capacitor by reducing inductance when attaching the bus bar on a sprayed surface of a capacitor device, thereby reducing impedance of the capacitor such that heat generation can be restrained during use of the capacitor, and a product fabricated by the same.

2. Description of the Related Art

In general, electric equipment capacitor devices, phase-advanced capacitor devices and electronic equipment capacitor devices are used in a variety of industrial fields.

In the capacitor device, a plastic film such as polyethylene terephthalate resin, polypropylene resin, polyethylene naphthalate resin, polycarbonate resin and the like is used as a dielectric. The capacitor device is fabricated by winding a vapor-deposited metal film on either or both sides of the plastic film, and forming a polar plate (hereinafter, referred to as "sprayed surface") on both sides of the wound vapor-deposited film by spraying Zn, Zn alloy, tin, or Zn firstly and tin secondarily. Here, the sprayed surfaces of the capacitor fabricated by the vapor-deposited film do not have discrimination of polarities.

Since the capacitors have different capacitance in accordance with their usages, the capacitors are fabricated to have the predetermined capacitance by increasing and decreasing the number of capacitor devices. When fabricating a large-capacitance capacitor, bus bars are connected to the capacitor devices.

More specifically, in the capacitor comprising a number of the capacitor devices, a pair of bus bars are connected to the sprayed surfaces disposed at both sides of each capacitor device by soldering. In addition, a cable connection terminal is bonded to the bus bar.

As shown in FIGS. 1A and 1B, the capacitors including the pair of bus bars 1 and 2 attached thereto are received in an outer case 6 such as a plastic case or a metal case. Next, the outer case 6 is charged with an insulating material including epoxy, urethane and the like, and the insulating material is cured in the outer case 6. Thus, fabrication of the capacitor is completed. The sprayed surfaces of the capacitor device 3 may be arranged horizontally or vertically as intended by a manufacturer.

The capacitor device 3 and the pair of bus bars 1 and 2 are fixed to each other by curing of the insulating material. Only the terminals 4 attached to the bus bars 1 and 2 are exposed to the outside of the outer case 6, thereby constituting a polar device which is connected with a power cable.

However, when the voltage or current being applied is high, heat generates at the capacitor device 3. Such heat deteriorates electric characteristics, lifespan and reliability of the capacitor.

The above problems are caused by inductance generated from various component parts of the capacitor.

The assembling process and structure of a conventional capacitor will now be described.

As shown in FIG. 1A, in the conventional capacitor device 3, when the pair of bus bars 1 and 2 are attached to the sprayed surfaces 5 of the capacitor device 3, to be insulated from each other, any one of the bus bars 1 and 2 is connected to one sprayed surface and the other one is connected to the other sprayed surface, thereby forming a serial connection.

However, although variations in the structure of the serial bus bar were applied as shown in FIGS. 1A, 2A and 3A, more specifically, by varying thickness and width of the bus bar and the interval between the bus bars, such structural changes did not influence a degree of the impedance. Also, there happened no noticeable change regarding the effect.

SUMMARY OF THE INVENTION

Therefore, the present invention has been made in view of the above problems, and it is an object of the present invention to provide a method for connecting a bus bar of a capacitor, capable of improving electric characteristics and reliability of the capacitor by reducing impedance generated from the capacitor, accordingly elongating the lifespan of the capacitor, and a product fabricated by the same.

In accordance with the present invention, the above and other objects can be accomplished by the provision of a method for connecting a bus bar of a capacitor, after fabricating a capacitor device by winding or depositing a vapor-deposited metal film on either or both sides of a plastic film and forming polar plates, that is, sprayed surfaces on both sides of the wound vapor-deposited film by spraying Zn, Zn alloy, tin, or Zn firstly and tin secondarily, and when connecting a pair bus bars to the both sprayed surfaces, the method comprising connecting a plurality of lead frames arranged alternately on a first bus bar of the pair of bus bars, to the sprayed surfaces disposed at opposite sides of neighboring capacitor devices, facing in a diagonal direction; connecting a plurality of lead frames arranged alternately on a second bus bar of the pair of bus bars, to the sprayed surfaces facing in another diagonal direction across the above diagonal direction in an X-shape; and assembling the pair of bus bars to be insulated from each other and overlapped at one side of the capacitor device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, a method for connecting a bus bar of a capacitor and a product fabricated by the same according to an exemplary embodiment of the present invention will be described in detail with reference to FIG. 4A to FIG. 5B.

Figure 4A:
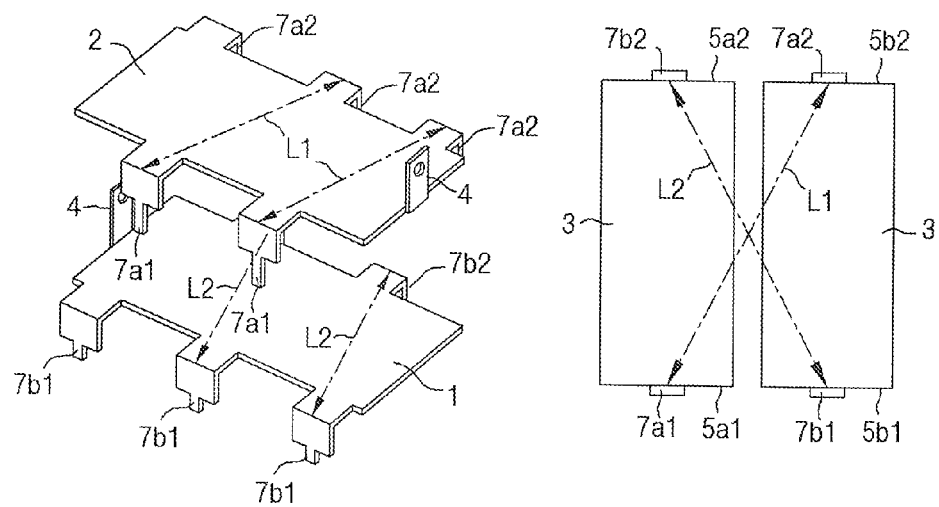
FIG. 4A are a perspective view and a plan view showing the structure of a bus bar according to an embodiment of the present invention.
Figure 4B:
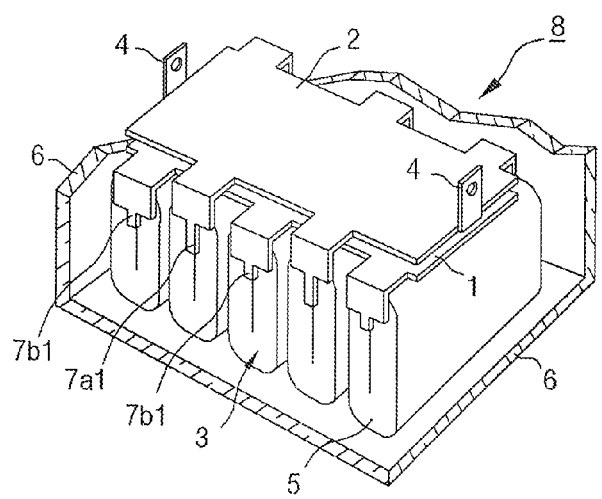
FIG. 4B is a partially-cut perspective view showing a state where the bus bar of FIG. 4A is connected to a capacitor device.

FIG. 4A are a perspective view and a plan view showing the structure of a bus bar according to an embodiment of the present invention. FIG. 4B is a partially-cut perspective view showing the bus bar of FIG. 4A being connected to a capacitor device.

Exemplary Embodiment

As shown in FIG. 4A, a reference numeral "L1" refers to a diagonal line connecting sprayed surfaces 5a1 and 5b2 disposed at opposite sides each of two neighboring capacitor devices 3, and a reference numeral "L2" refers to a diagonal line connecting other sprayed surfaces 5b1 and 5a2 of the two capacitor devices 3, crossing the diagonal line L1 in an X-shape.

Pluralities of lead frames 7b1 and 7b2 of a first bus bar 1 are arranged alternately in a direction of the diagonal line L2. Meanwhile, pluralities of lead frames 7a1 and 7a2 of a second bus bar 2 are arranged alternately in a direction of the diagonal line L1.

Accordingly, when the lead frames 7a1, 7a2, 7b1 and 7b2 arranged alternately on the pair of bus bars 1 and 2 are attached to the respective sprayed surfaces 5a1 and 5b2, and 5b1 and 5a2 disposed along the respective diagonal lines L1 and L2, the pair of bus bars 1 and 2 of the plurality of capacitor devices 3 are connected in parallel.

Here, the number and interval of the lead frames arranged on the bus bars 1 and 2 in the directions of the diagonal lines L1 and L2 may be properly increased and decreased depending on the number and size of the combined capacitor devices 3.

Figure 5A:
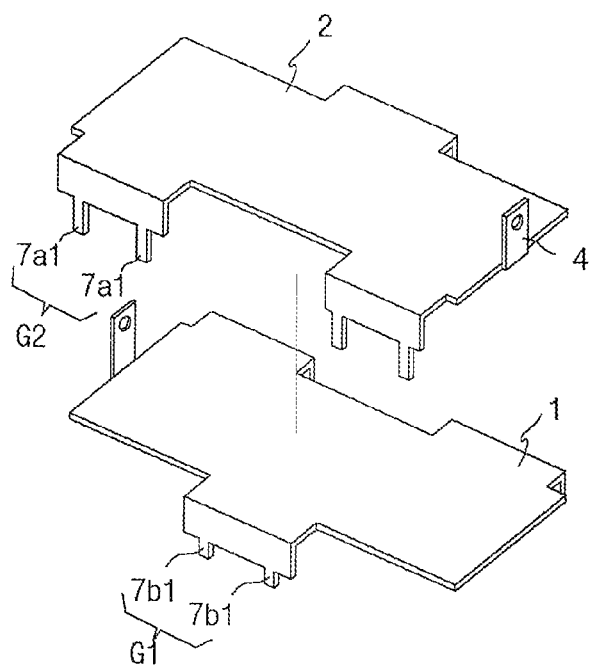
FIG. 5A is an exploded perspective view showing an application example of the bus bar according to the embodiment of the present invention.
Figure 5B:
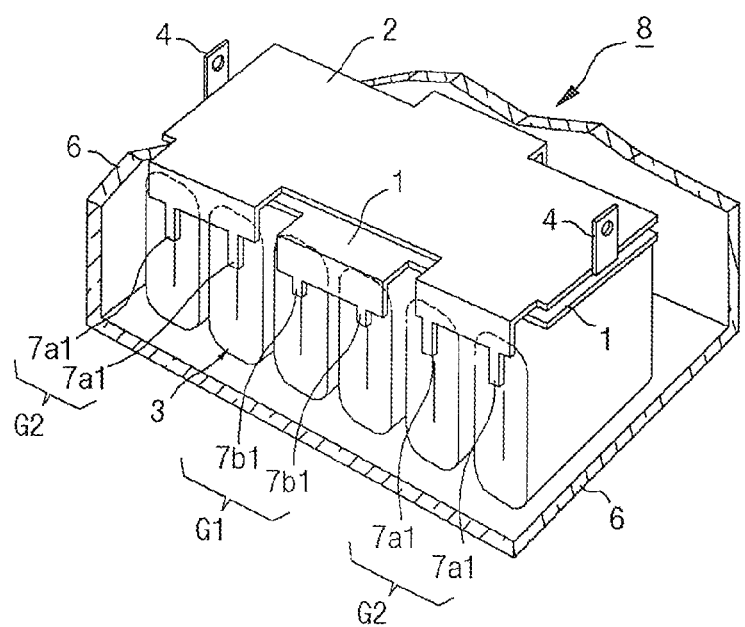
FIG. 5B is a partially-cut perspective view showing main parts of a capacitor adopting the bus bar shown in FIG. 5A.

According to an application example illustrated in FIG. 5A and FIG. 5B, the lead frames are divided into groups G1 and G2 and connected to the sprayed surfaces 5a1 and 5b2, and 5b1 and 5a2 of the capacitor devices 3, forming a parallel circuit, such that the lead frames 7a1 and 7a2, and 7b1 and 7b2 arranged alternately on the pair of bus bars 1 and 2 can be connected to the sprayed surfaces 5a1 and 5b2, and 5b1 and 5a2 along the diagonal directions L1 and L2 same as above. In this case, intervals are provided among the groups G1, corresponding to width of the capacitor devices 3 included in a different group, that is, the group G2, and the lead frames included in the group G2 of the other bus bar are disposed corresponding to the intervals.

The pair of bus bars 1 and 2 are connected to one circumferential side of the capacitor device 3, being spaced apart from each other. More particularly, the pair of bus bars 1 and 2 are disposed in an overlapping manner and insulated from each other.

The capacitor device attached with the bus bars 1 and 2 is mounted in an outer case 6. The outer case 6 is charged with an insulating material. Thus, a capacitor is fabricated.

Hereinafter, the assembling process of the bus bar according to an embodiment of the present invention will be described.

As shown in FIG. 4B, the lead frames of the pair of bus bars 1 and 2 are attached to the sprayed surfaces formed on both sides of the capacitor device 3, the plurality of capacitor devices 3 are connected parallel by the pair of bus bars 1 and 2.

In the above-structured bus bars 1 and 2 and the capacitor devices 3, the first bus bar 1 and the second bus bar 2 are insulated from each other by inserting an insulating film between the pair of bus bars 1 and 2, keeping an interval between the bus bars 1 and 2, or mounting an insulating member. Additionally, insulation between neighboring capacitor devices 3 is also performed by any one method of distancing the capacitor devices 3, inserting an insulation film between the capacitor devices 3, and mounting an insulating member in the outer case 6.

For reference, the direction and number of the terminals 4 of the lead frames of the respective bus bars 1 and 2 can be variously changed according to the manufacturer's intention.

Figure 1A:
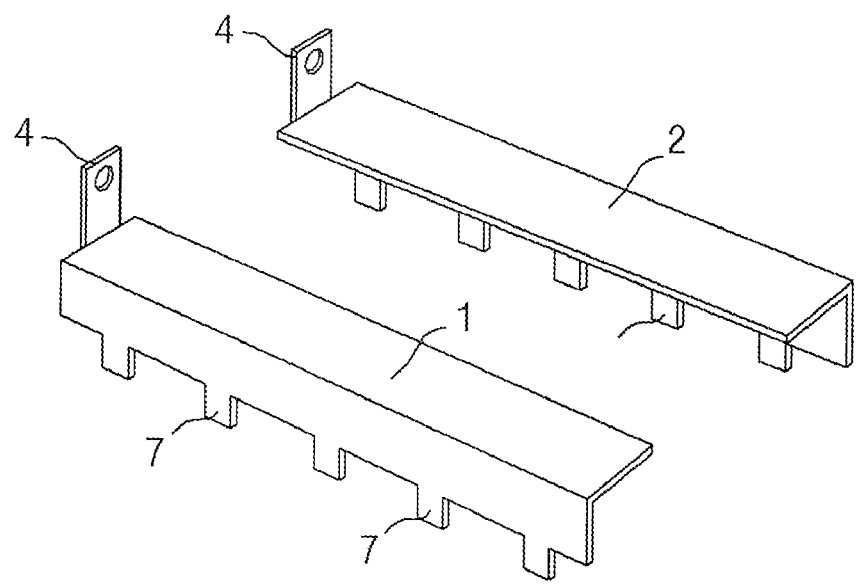
FIG. 1A is an exploded perspective view of a bus bar of a capacitor according to a conventional art.
Figure 1B:
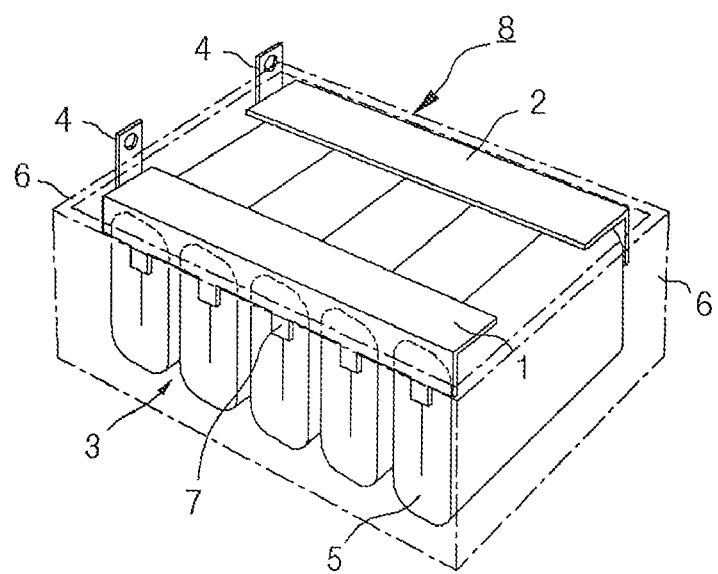
FIG. 1B is a partially-cut perspective view showing main parts of the conventional capacitor adopting the bus bar shown in FIG. 1A.
Figure 2A:
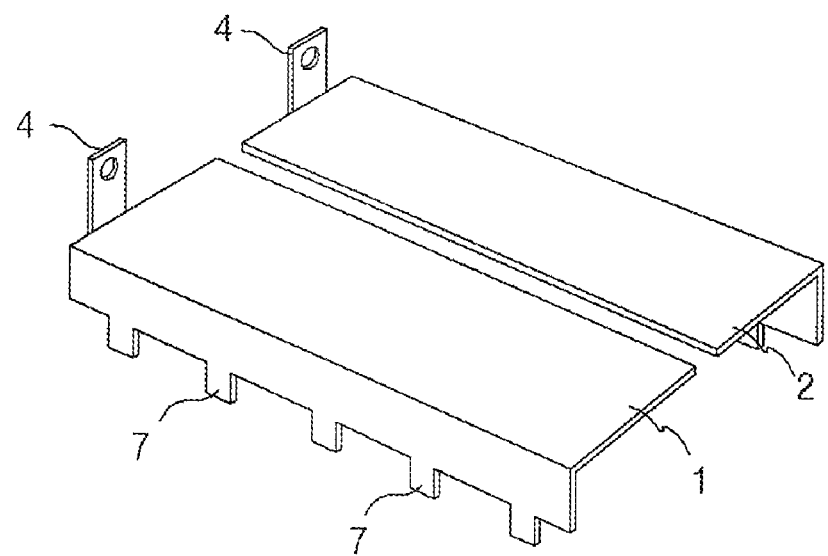
FIG. 2A is an exploded perspective view of a bus bar of another conventional capacitor.
Figure 3A:
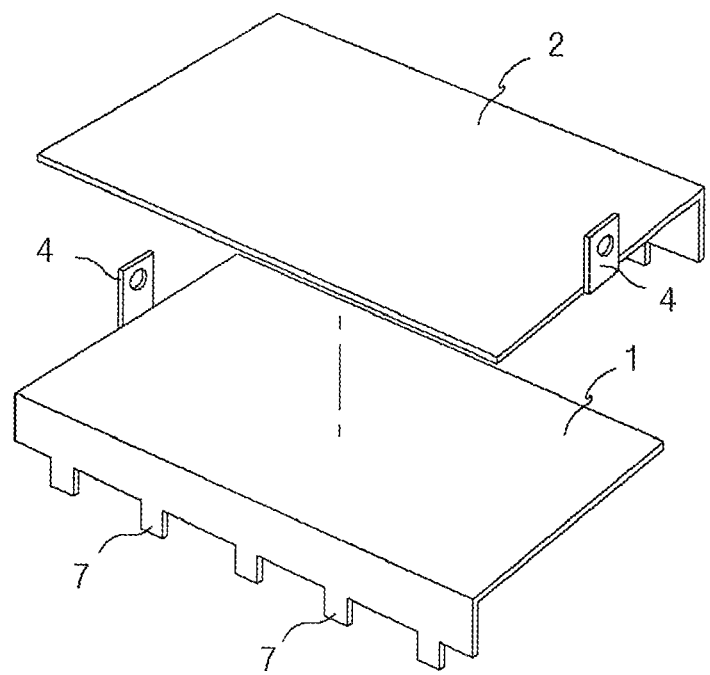
FIG. 3A is an exploded perspective view of a bus bar of still another conventional capacitor.

In the embodiment of the present invention, the pair of bus bars 1 and 2 can be applied regardless of the thickness thereof. For example, from 0.01 mm to several millimeters of bus bars 1 and 2 can be applied. In a case where the capacitor having a 600 μF capacitance is fabricated by using the bus bars of 1 mm thickness and a vapor-deposited polypropylene film, the inductance is measured at the frequency of 800 KHz. The inductance of a conventional capacitor applying the bus bar shown in FIG. 1A as a comparative example 1, another conventional capacitor applying the bus bar shown in FIG. 2A as a comparative example 2, still another conventional capacitor applying the bus bar shown in FIG. 3A as a comparative example 3, and a capacitor applying the bus bar shown in FIG. 4A according to the embodiment of the present invention were measured, and the result was obtained as shown in [Table 1] below.

TABLE 1

Figure 2B:
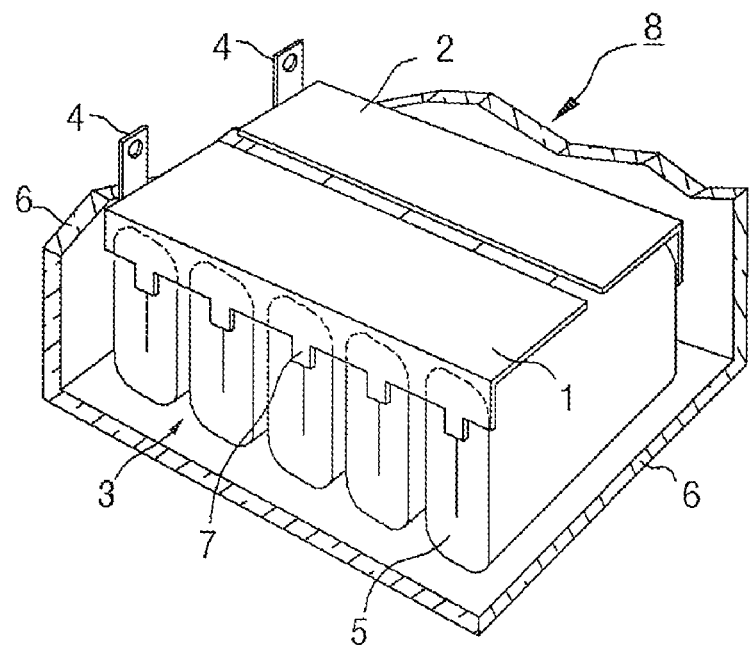
FIG. 2B is a partially-cut perspective view showing main parts of the conventional capacitor adopting the bus bar shown in FIG. 2A.
Figure 3B:
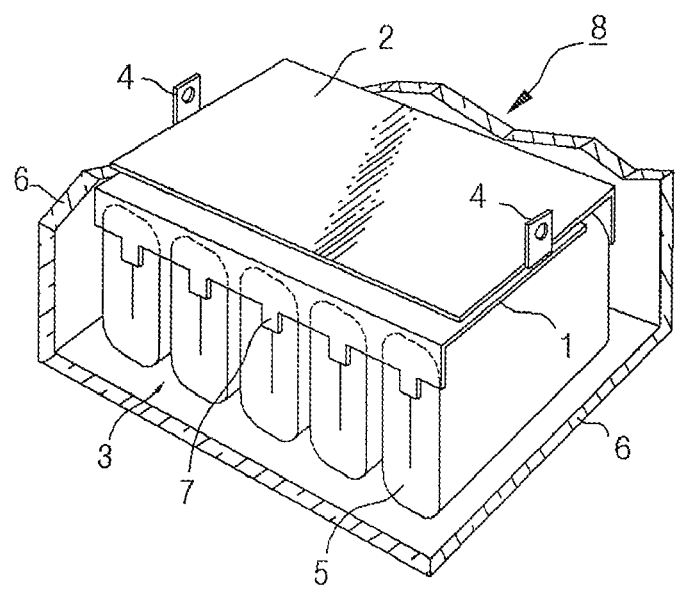
FIG. 3B is a partially-cut perspective view showing main parts of the conventional capacitor adopting the bus bar shown in FIG. 3A.

| Class | Inductance (nH) | Area of bus bar |
|---|---|---|
| Bus bar of embodiment of invention FIG. 4A | 6.3 | 100% |
| Comparative example 1 (bus bar of FIG. 1A) | 19.4 | 25% |
| Comparative example 2 (bus bar of FIG. 2B) | 17.1 | 50% |
| Comparative example 3 (bus bar of FIG. 3B) | 12.2 | 95% |

Referring to [Table 1], according to the method for connecting the capacitor bus bar in accordance with the embodiment of the present invention, the inductance is reduced to 6.3 nH from 19.4 nH of the comparative example 1 according to the conventional art, that is, reduced by 67.3%. In comparison with 17.1 nH of the comparative example 2, the inductance is reduced by 63.1%. Furthermore, in comparison with 12.2 nH of the comparative example 3, the inductance is reduced by 48.3%. Thus, the bus bar connecting method according to the present invention is much more excellent than the conventional ones.

As can be understood from [Equation 1] and [Equation 2] that will be explained hereinafter, as the inductance (nH) is lowered, the impedance is decreased. Accordingly, heat generation of the capacitor can be reduced, thereby achieving the capacitor having an excellent heat resistance.

Meanwhile, the capacitors shown in FIGS. 4B and 5B have an oval sectional shape since being formed in a manner that the capacitor device 3 winds a film and then compresses the film. However, even when the capacitor device 3 has a circular sectional shape, the same effect can be obtained.

Moreover, in the above description, insulation between the capacitor device 3 and the first bus bar 1 and between the first bus bar 1 and the second bus bar 2 is performed by any one selected from inserting an insulating film and distancing the respective members, and insulation between capacitor devices 3 having different polarities have been explained and illustrated by way of example, those skilled in the art will appreciate that various modifications, additions and substitutions are possible.

In other words, not only may the insulating material be changed but also the insulating material and the distancing method may be combinedly used, for example, by insulating one side by keeping a distance while insulating the other side using the insulating material. Furthermore, the first bus bar 1 and the second bus bar 2 may be insulatedly adhered to each other. Therefore, the present invention is not limited to the drawings and the above explanation.

Also, although the capacitor device 3 comprising only one row has been described herein, the number of rows and layers can be variably modified.

As apparent from the above description, in accordance with a method for connecting a bus bar of a capacitor according to the embodiment of the present invention, when a pair of bus bars are independently connected to sprayed surfaces of both sides of a plurality of the capacitor devices, the pair of bus bars are connected to the capacitor devices in parallel, to be insulated and overlapped with respect to each other at one side of the capacitor device. Accordingly, inductance of the capacitor can be reduced.

Here, the reduction of the inductance can be appreciated from [Equation 1] and [Equation 2] as follows. According to [Equation 1] and [Equation 2], as the inductance is reduced, impedance is accordingly reduced, thereby restraining generation of heat caused by resistance. As a consequence, temperature characteristics of the capacitor can be enhanced, also improving reliability of the capacitor in a high temperature environment.

$$Z=R+(WL-1/WC) \qquad [\text{Equation 1}]$$

Z [Ω]: impedance
R[Ω]: resistance
W: $2\pi f$
L: inductance
C: capacitance of capacitor $$J=I^2Rt \qquad [\text{Equation 2}]$$

J: Joule's heat
I: current
R: impedance, resistance

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for connecting a bus bar to a capacitor, the capacitor comprising a plurality of capacitor devices, each of the capacitor devices having been fabricated by winding or depositing a vapor-deposited metal film on either or both sides of a plastic film and forming polar plates, that is, sprayed surfaces on both sides of the wound vapor-deposited film by spraying Zn, Zn alloy, tin, or Zn firstly and tin secondarily, the method comprising:

connecting a plurality of lead frames arranged alternately on opposing sides of one of the pair of bus bars to the sprayed surfaces disposed at opposite sides of neighboring capacitor devices, the alternating lead frames electrically facing in a direction along a diagonal line;

connecting a plurality of lead frames arranged alternately on opposing sides of the other one of the bus bars to the sprayed surfaces, the alternating lead frames of the other one of the bus bars electrically facing in another diagonal line crossing the diagonal line; and assembling the pair of bus bars to be insulated from each other and overlapped at one side of the capacitor device.

2. The method of claim 1, wherein the one of the pair of bus bars and the other one of the pair of bus bars are each electrically coupled to the capacitor in parallel.

3. A method for connecting a bus bar to a capacitor, the capacitor comprising a plurality of capacitor devices, each capacitor device having been fabricated by winding or depositing a vapor-deposited metal film on both sides of a plastic film and forming polar plates, the polar plates constituting opposing sprayed surfaces, the method comprising:

arranging the fabricated capacitor devices in succession;

electrically connecting a first bus bar of the pair of bus bars to the sprayed surfaces of the capacitor devices, the first bus bar having a first side, a second side opposing the first side, and a plurality of lead frames alternating between the first side and the second side, wherein the alternating lead frames electrically couple to opposing sprayed surfaces of adjacent capacitor devices;

electrically connecting a second bus bar of the pair of bus bars to the sprayed surfaces of the capacitor devices, the second bus bar having a first side, a second side opposing the first side, and a plurality of lead frames alternating between the first side and the second side, wherein the alternating lead frames electrically couple to opposing sprayed surfaces of adjacent capacitor devices not electrically coupled to the first bus bar, such that the electrical path of the second bus bar diagonally crosses the electrical path of the first bus bar;

assembling the pair of bus bars to be overlapped at one side of the capacitor.

4. The method of claim 3, wherein each of the plurality of lead frames comprises a group of lead frames, each of the groups of lead frames electrically coupling to more than one adjacent capacitor device and the alternating groups of lead frames electrically coupling to opposing adjacent capacitor devices.

5. The method of claim 3, wherein the winding or depositing a vapor-deposited metal film on both sides of a plastic film further comprises spraying Zn, Zn alloy, tin, or Zn firstly and tin secondarily on both sides of the plastic film.

6. The method of claim 3, wherein assembling the pair of bus bars to be overlapped further comprises:

insulating the first and second bus bars.

7. The method of claim 6, wherein insulating the first and second bus bars further comprises placing insulation material or sufficient distance between the first bus bar and the plurality capacitor devices and placing insulation material or sufficient distance between the first bus bar and the second bus bar.

8. The method of claim 3, wherein arranging the capacitor devices in succession further comprises:

insulating the adjacent capacitor devices by placing insulation material or sufficient distance between adjacent capacitor devices.

9. The method of claim 3, wherein the first bus bar and the second bus bar are each electrically coupled to the capacitor in parallel.

* * * * *